United States Patent [19]

Duhaut et al.

[11] 3,898,178

[45] Aug. 5, 1975

[54] CATALYST FOR HYDROCARBON CONVERSION

[75] Inventors: Pierre Duhaut, Vesinet; Jean Miquel, Paris, both of France

[73] Assignee: Societe Francaise des Produits pour Catalyse, Rueil-Malmaison, France

[22] Filed: Dec. 13, 1972

[21] Appl. No.: 314,586

[30] Foreign Application Priority Data

Dec. 15, 1971 France ............................... 71.45196

[52] U.S. Cl. ................ 252/441; 252/442; 252/464; 252/465; 208/136; 208/138; 208/139
[51] Int. Cl. ............................................. B01j 11/78
[58] Field of Search ........... 252/441, 442, 464, 465, 252/466 PT; 208/139

[56] References Cited
UNITED STATES PATENTS

| | | | |
|---|---|---|---|
| 2,814,599 | 11/1957 | Lefrancois et al. | 252/441 X |
| 2,911,375 | 11/1959 | Coley et al. | 252/441 X |
| 2,914,464 | 11/1959 | Burton et al. | 252/441 X |
| 2,939,837 | 6/1960 | Berger | 252/441 X |
| 3,042,628 | 7/1962 | Cramer et al. | 252/465 |
| 3,507,781 | 4/1970 | Spurlock et al. | 252/466 PT X |
| 3,523,966 | 8/1970 | Ottmann et al. | 252/464 X |
| 3,554,902 | 1/1971 | Buss | 252/442 X |
| 3,657,265 | 4/1972 | Kober et al. | 252/441 X |
| 3,789,024 | 1/1974 | Myers | 252/466 PT |

*Primary Examiner*—Patrick P. Garvin
*Attorney, Agent, or Firm*—Millen, Raptes & White

[57] ABSTRACT

Catalyst and process for hydrocarbon conversions, e.g., reforming. The catalyst contains an alumina carrier, platinum, iridium, at least one metal selected from uranium, vanadium and gallium, and optionally halogen in the form of metal halide of one of the aforesaid components.

13 Claims, No Drawings

CATALYST FOR HYDROCARBON CONVERSION

This invention concerns a new catalyst containing (a) alumina, (b) platinum, (c) iridium and (d) a metal selected from the group consisting of uranium, vanadium and gallium, hereinafter referred to as group (d).

The invention also concerns the use of this catalyst in hydrocarbon conversion reactions, for example a reforming reaction.

Catalysts containing platinum deposited on alumina have been known for years, but, in spite of the many improvements brought to these catalysts, for example by incorporating thereto additives such as tungsten, molybdenum, iridium, rhodium and the like, attempts are never-ending to uncover new platinum containing catalysts which would give better yields than those obtained up to now and would have a longer life than that of the known catalysts. Attempts are also made to improve the mechanical strength of these catalysts, since they are usually employed in fixed or moving bed, in the form of conglomerates, for example balls or extrudates of significant size, so as to allow the gaseous reactants to pass easily therethrough. The attrition of these catalysts results in the formation of much smaller grains which progressively reduce the free space between the grains and require the inlet reactant pressure to be increased or even the operation to be stopped.

It has now been found that particularly high yields may be obtained, for example in reforming reactions, when using a catalyst containing alumina and both platinum and one metal selected from the group consisting of uranium, vanadium and gallium; above all it has been found that the life time of such a catalyst is increased when it contains iridium as a third metal element.

The yields are thus stable over long periods.

The catalyst of the invention thus contains (a) an alumina carrier, (b) platinum, (c) iridium, (d) at least one metal selected from uranium, vanadium and gallium and, when desirable, (e) a halogen, for example chlorine or fluorine.

The catalyst of the invention preferably contains from 0.005 to 1 %, particularly from 0.05 to 0.8 % of platinum, from 0.005 to 1 %, particularly from 0.01 to 0.09 % of iridium and from 0.005 to 5 %, particularly from 0.05 to 3 % of a metal selected from uranium, vanadium and gallium, these percentages being expressed by weight with respect to the catalyst carrier.

Whenever required, the catalyst further contains from 0.1 to 10 % and preferably from 0.2 to 5 % by weight of a halogen, for example chlorine or fluorine, with respect to the catalyst carrier.

The catalyst may be manufactured according to conventional methods consisting of impregnating the carrier by means of solutions of the metal compounds to be introduced therein. Either a common solution of these metals or separate solutions of each metal are to be used. When using several solutions, one may proceed with intermediate drying and/or roasting steps. A final roasting is carried out for example at about 500 – 1000°C, preferably in the presence of free oxygen, for example with air stripping.

The compounds of the metals from group (d) are selected from the nitrates, chlorides, bromides, fluorides, sulfates or acetates, or any other salt of these metals which is soluble in water or hydrochloric acid (for example chloroplatinate).

Platinum may be used in any known manner, for example as hexachloroplatinic acid, ammonium chloroplatinate, platinum sulfide, sulfate or chloride.

Iridium may be employed in any known manner, for example as chloride, bromide, sulfate or sulfide or as hexachloroiridic acid, hexabromoiridic acid or hexafluoroiridic acid.

The halogen may be introduced as one of the above halides or in the form of hydrochloric acid, hydrofluoric acid, ammonium chloride, ammonium fluoride, gaseous chlorine or a hydrocarbon halide, for example $CCl_4$, $CHCl_3$ or $CH_3Cl$.

A first manufacturing method consists, for example, in impregnating the carrier by means of an aqueous solution of a nitrate or other compound of a metal from group (d), drying at about 120°C and heating in air for a few hours to a temperature of from 500° to 1000°C, preferably about 700°C; a second impregnation will then be performed by means of a solution containing platinum and iridium, (for example a solution of hexachloroplatinic and hexachloroiridic acid).

Another method consists, for example, in impregnating the carrier by means of a solution containing:

1. platinum, for example hexachloroplatinic acid
2. iridium, for example hexachloroiridic acid
3. the metal selected from group (d), for example a chloride, bromide, fluoride, sulfate or acetate of the selected metal or any other salt of the selected metal soluble in water or hydrochloric acid (for example chloroplatinate) and,
4. optionally chlorine or fluorine.

Another method consists of introducing the metal elements by successive impregnations each of a different metal element of the catalyst; for example by effecting a first introduction of iridium as contained in a solution, optionally followed with drying and roasting steps, a subsequent introduction of platinum as contained in a solution optionally followed with drying and roasting steps, and finally the introduction of the metal from group (d) as above defined, followed with drying and roasting steps at a temperature of about 500°– 1000°C.

Whenever required, the impregnations may be performed in any different order.

The porous aluminae used for manufacturing the catalyst of the invention are well-known and need not to be further described.

The resulting catalysts may be used in many known hydrocarbon conversion reactions, in which platinum catalysts have been previously used, particularly reforming, dehydrogenation, aromatization, dehydrocyclisation isomerization and hydrocracking. These reactions are usually carried out in the temperature range of from 300° to 600°C.

The reforming reactions are usually conducted at a temperature of from about 450° to about 580°C, under a pressure of from about 5 to about 20 $kg/cm^2$ at a hourly feeding rate of from 0.5 to 10 volumes of liquid charge (naphtha boiling in the range of from about 60° to about 220°C) per volume of catalyst.

The following examples illustrate the invention but must not be considered as limiting the scope thereof in any respect:

EXAMPLE 1

The following naphtha is treated:

| | | |
|---|---|---|
| Distillation | A.S.T.M. | : 80 – 160°C |
| Composition : | aromatic hydrocarbons | : 7 % by weight |
| | naphthenic hydrocarbons | : 27 % by weight |
| | paraffinic hydrocarbons | : 66 % by weight |
| Octane number | (clear research) | : about 37 |
| Average molecular weight | | : 110 |
| Specific gravity at 20°C | | : 0.782 |

This naphtha is passed with recycle hydrogen over various alumina-containing catalysts A – C having a content of metal elements as reported in table 1. The catalysts A – C have a specific surface of 230 m²/g, a pore volume of 54 cc per gram and a chlorine content of 1 %.

The catalysts have been prepared from an alumina having a surface of 240 m²/g and a pore volume of 59 cc per gram.

Catalyst A has been manufactured by adding to 100 g of alumina 100 cc of an aqueous solution of 1.05 g of uranyl nitrate $UO_2(NO_3)_3$, 6 $H_2O$, 2,24 g of concentrated HCl (d:1.19), 8 g of an aqueous solution of chloroplatinic acid with a 2.5 % by weight platinum content, 2.18 g of a chloroiridic aqueous acid solution having a 2.3 % by weight Ir content, and 4.3 cc of a 20 % monoethanolamine aqueous solution (this solution has a pH of 3.8).

After 5 hours of contact, the solid material is separated, dried for 1 hour at 100°C and then roasted for 4 hours at 530°C in dry air (drying with activated alumina).

It is finally reduced in a dry hydrogen stream (dried over activated alumina) for 2 hours at 450°C.

The obtained catalyst contains:

0.02 % of platinum, 0.05 % of iridium, 0.5 % of uranium and 1.14 % of chlorine expressed by weight with respect to the catalyst carrier. The other catalysts B and C have been prepared according to similar methods and need not to be further described.

The operation is so conducted as to obtain a clear octane number of 96.2.

The experimental conditions are the following:

| | |
|---|---|
| Pressure | 20 bars |
| Molar ratio of $H_2$ to the hydrocarbons | 5 |
| Naphtha weight/catalyst weight/hour | 3 |

The temperature at the reactor inlet is 490± 1°C. It is sufficient to raise it stepwise up to 530°C, for maintaining the octane number constant.

The $C_5^+$ yield and the hydrogen % in the recycled gas, when the desired octane number is obtained, are given in table I for catalysts A – C.

EXAMPLE 1 A

This example is given for comparison purposes and forms no part of this invention.

Example 1 is repeated with the use of a catalyst containing 0.25 % of platinum (one single catalytic element) and a catalyst containing 0.20% of platinum and 0.05 % of iridium. Both catalysts contain 1.14 % of chlorine.

The $C_5^+$ yield and the % hydrogen in the recycled gas, when the desired octane number is attained, are given in table I A for the two catalysts.

It may be observed that, when using a catalyst containing only platinum or even a catalyst containing only platinum and iridium, the yields are substantially lower than those obtained with catalysts A – C, reported in table I.

TABLE I A

| Catalyst | Yield of $C_5^+$ by weight | Molar % of $H_2$ in the recycled gas |
|---|---|---|
| 0.25 % Pt | 81.8 | 81.6 |
| 0.20 % Pt, 0.05 % Ir | 81.9 | 81.8 |

EXAMPLE 2

Example 1 is repeated with the use of catalysts A' – C' and A" – C" identical to the catalysts A – C, except that each of the catalysts A' – C' contains 0.004 % of a metal from group (d) and each of the catalysts A"–C" contains 0.08 % of metal of group (d). All th catalysts contain 1.14 % of chlorine. The results obtained with catalysts A' – C' are all substantially the same as those obtained with the catalyst of table I A which contains 0.20 % of platinum and 0.05 % of iridium. The results obtained with catalysts A" – C" are given in table II. They are substantially identical to those reported in table I.

EXAMPLE 3

Example 1 is repeated with the use of catalysts $A_1$–$C_1$ which do not contain iridium. The other characteristics of the catalysts $A_1$–$C_1$ are substantially those of the catalysts A–C used in example 1. The content of metal elements was however slightly modified so as to obtain the same total content of metal elements in catalysts $A_1$–$C_1$ and A – C. These catalysts contain 1.14 % of chlorine.

The $C_5^+$ yield and the hydrogen % in the recycled gas when the desired octane number of 96.2 have been obtained, are given in table III.

The results achieved with the use of catalysts $A_1$–$C_1$ are slightly inferior and sometimes even similar to those obtained respectively with catalysts A – C; but the main advantage of the catalysts of this invention is, above all, in their substantially longer lifetime, as compared to the catalysts used up to now.

Thus table IV of example 3 shows that, at mid-run and when using catalysts $A_1$–$C_1$, the $C_5^+$ yield and the hydrogen % in the recycled gas are respectively lower than when using catalysts A – C. The mid-run time depends on the catalyst: it is the greater as the catalyst is the more stable; it is roughly 550 hours for catalysts A – C and only about 370 hours for catalysts $A_1$–$C_1$. (It may be noted that the mid-run time, when using a catalyst containing 0.2 % of platinum and 0.05 % of iridium, is about 400 hours).

Although the catalysts $A_1$–$C_1$ and A" – C" are not strictly comparable since catalysts $A_1$–$C_1$ have not the same total content of metal elements as the catalysts A"–C"; it must be noted that, when using the catalysts A" – C" of this invention, which contain 0.2 % of platinum, 0.05 % of iridium and relatively low amounts of a metal from group (d), there are obtained as shown in table II, substantially similar results to those obtained with catalysts $A_1$–$C_1$ which contain 0.25 % of platinum and 0.5 % of at least one metal from group (d) but without iridium and which do not conform to the invention, as it is apparent in table III.

As hereinbefore indicated the catalysts of this invention have the main advantage of a long lifetime. Thus, by comparing the results obtained at mid-run with catalysts $A_1-C_1$, as shown in table IV to those obtained at mid-run with catalysts $A''-C''$, shown in table V, it appears that the $C_5^+$ yields and the hydrogen % in the recycled gas are better when using catalysts $A''-C''$, which demonstrates the superiority of catalysts such as $A''-C''$ over catalysts such as $A_1-C_1$. Moreover, the mid-run time of roughly 530 hours, when using the catalysts $A''-C''$, is far longer than that obtained with catalysts $A_1-C_1$ (roughly 370 hours).

EXAMPLE 4

The production of a gasoline having a very high octane number requires such severe conditions that conventional catalysts can hardly withstand same.

The present example shows that it is quite possible when using the catalysts of this invention, even under particularly severe conditions, to produce a gasoline of very high octane number.

The feedstock of example 1 is so treated as to produce a gasoline of a 103 O.N. (clear); the catalysts A, B, C are used under the following conditions:

| | |
|---|---|
| pressure | : 10 bars |
| temperature | : 530°C |
| Molar ratio $H_2$/hydrocarbons | : 8 |
| naphtha weight/catalyst weight/hour | : 1.65 |

Table VI gives the $C_5^+$ yield and the hydrogen % content of the recycled gas after 200 hours. By way of comparison, the $C_5^+$ yield by weight is 75.1 % and the molar hydrogen percent is 74.8, when working under the same conditions with a catalyst containing 0.2 % of platinum and 0.05 % of iridium.

TABLE I

| CATALYST % by weight | | | Yield % $C_5^+$ by weight | Recycled gas % $H_2$ (by moles) |
|---|---|---|---|---|
| | % Pt | % Ir | % metal (d) | | |
| A | 0.2 | 0.05 | 0.5 uranium | 82.1 | 82.1 |
| B | 0.2 | 0.05 | 0.5 vanadium | 82.4 | 82.6 |
| C | 0.2 | 0.05 | 0.5 gallium | 82.7 | 82.7 |

TABLE II

| CATALYST % by weight | | | Yield % $C_5^+$ by weight | Recycled gas % $H_2$ (by moles) |
|---|---|---|---|---|
| | % Pt | % Ir | % metal (d) | | |
| A'' | 0.2 | 0.05 | 0.08 uranium | 82.0 | 82.0 |
| B'' | 0.2 | 0.05 | 0.08 vanadium | 82.4 | 82.5 |
| C'' | 0.2 | 0.05 | 0.08 gallium | 82.6 | 82.6 |

TABLE III

| CATALYST % by weight | | Yield % $C_5^+$ by weight | Recycled gas % $H_2$ (by moles) |
|---|---|---|---|
| | % Pt | % metal (d) | | |
| $A_1$ | 0.25 | 0.5 uranium | 82.0 | 82.1 |
| $B_1$ | 0.25 | 0.5 vanadium | 82.4 | 82.5 |
| $C_1$ | 0.25 | 0.5 gallium | 82.5 | 82.6 |

TABLE IV

| CATALYST % by weight | | | Yield % $C_5^+$ mid-run by weight | Recycle gas % $H_2$ mid-run (by moles) |
|---|---|---|---|---|
| | % Pt | % Ir | % metal (d) | | |
| A | 0.2 | 0.05 | 0.5 uranium | 82.0 | 81.4 |
| $A_1$ | 0.25 | — | 0.5 uranium | 81.4 | 81.3 |
| B | 0.2 | 0.05 | 0.5 vanadium | 82.1 | 82.4 |
| $B_1$ | 0.25 | — | 0.5 vanadium | 81.4 | 81.6 |
| C | 0.2 | 0.05 | 0.5 gallium | 82.6 | 82.6 |
| $C_1$ | 0.25 | — | 0.5 gallium | 81.7 | 82.1 |

TABLE V

| CATALYST % by weight | | | Yield % $C_5^+$ mid-run by weight | Recycle gas % $H_2$ mid-run (by moles) |
|---|---|---|---|---|
| | % Pt | % Ir | % metal (d) | | |
| A'' | 0.2 | 0.05 | 0.08 uranium | 81.7 | 81.1 |
| B'' | 0.2 | 0.05 | 0.08 vanadium | 81.9 | 82.1 |
| C'' | 0.2 | 0.05 | 0.08 gallium | 82.3 | 82.4 |

TABLE VI

| CATALYST | Yield % $C_5^+$ by weight | Recycle gas % $H_2$ (by moles) |
|---|---|---|
| A | 79.4 | 78.8 |
| B | 78.6 | 78.2 |
| C | 77.9 | 77.7 |

What we claim is:

1. A catalyst consisting essentially of (a) an alumina carrier (b) from 0.005 to 1 % of platinum, (c) from 0.005 to 1 % of iridium and (d) from 0.005 to 5 % of at least one metal selected from the group consisting of uranium and vanadium, the percentages being by weight with respect to the carrier.

2. A catalyst according to claim 1, containing a total of from 0.05 to 3 % by weight with respect to the carrier of metal selected from the group consisting of uranium and vanadium.

3. A catalyst according to claim 1, further containing from 0.1 to 10% by weight, with respect to the carrier, of a halogen in the form of a metal halide of component (a), (b), (c) or (d) or mixtures thereof.

4. A catalyst according to claim 3 wherein said at least one metal (d) is vanadium.

5. A catalyst according to claim 4 wherein vanadium is present in a concentration of 0.05 to 3% by weight with respect to the carrier.

6. A catalyst according to claim 3 containing 0.2 to 5% by weight of said halogen.

7. A catalyst according to claim 3 containing 0.05 to 0.8% by weight of platinum and 0.01 to 0.09% by weight of iridium.

8. A catalyst according to claim 3 containing on a weight basis 0.05 to 0.8% of platinum, 0.01 to 0.09% of iridium, 0.05 to 3% of vanadium, and 0.2 to 5% by weight of said halogen, the latter being chlorine or fluorine.

9. A catalyst according to claim 3 wherein said at least one metal (d) is uranium.

10. A catalyst according to claim 9 wherein uranium is present in a concentration of 0.5 to 3% by weight with respect to the carrier.

11. A catalyst according to claim 9 containing 0.2 to 5% by weight of said halogen.

12. A catalyst according to claim 9 containing 0.05 to 0.8% by weight of platinum and 0.01 to 0.09% by weight of iridium.

13. A catalyst according to claim 9 containing on a weight basis 0.5 to 0.8% of platinum, 0.01 to 0.09% of iridium, 0.05 to 3% of uranium, and 0.2 to 5% by weight of said halogen, the latter being chlorine or fluorine.

* * * * *